United States Patent
Alcantar et al.

(10) Patent No.: US 10,766,790 B2
(45) Date of Patent: Sep. 8, 2020

(54) AMMONIA REMOVAL IN FRESHWATER AND SALTWATER SYSTEMS

(71) Applicants: Norma A. Alcantar, Tampa, FL (US); Wen Zhao, Temple Terrace, FL (US); Sarina Joy Ergas, Tampa, FL (US)

(72) Inventors: Norma A. Alcantar, Tampa, FL (US); Wen Zhao, Temple Terrace, FL (US); Sarina Joy Ergas, Tampa, FL (US)

(73) Assignee: University of South Florida, Tampa, FL (US)

(*) Notice: Subject to any disclaimer, the term of this patent is extended or adjusted under 35 U.S.C. 154(b) by 79 days.

(21) Appl. No.: 16/200,212

(22) Filed: Nov. 26, 2018

(65) Prior Publication Data

US 2019/0127237 A1    May 2, 2019

Related U.S. Application Data

(63) Continuation-in-part of application No. 16/023,396, filed on Jun. 29, 2018, now Pat. No. 10,166,528.
(Continued)

(51) Int. Cl.
C02F 1/42 (2006.01)
C02F 1/66 (2006.01)
(Continued)

(52) U.S. Cl.
CPC ............ *C02F 1/281* (2013.01); *A01K 63/04* (2013.01); *B01J 20/16* (2013.01); *B01J 20/165* (2013.01);
(Continued)

(58) Field of Classification Search
None
See application file for complete search history.

(56) References Cited

U.S. PATENT DOCUMENTS 5,019,254 A * 5/1991 Abrevaya ............ A01K 63/045
                                                        210/167.22
5,489,323 A   2/1996 Yoshida
(Continued)

FOREIGN PATENT DOCUMENTS

| EP | 0072147 A1 | 2/1983 |
| GB | 2192808 A  | 1/1988 |
| GB | 2245809 A  | 1/1992 |

OTHER PUBLICATIONS

Mook, W.T. et al. Removal of total ammonia nitrogen (TAN), nitrate and total organic carbon (TOC) from aquaculture wastewater using electrochemical technology: A review. Desalination 285 (2012) 1-13.
(Continued)

*Primary Examiner* — Matthew O Savage
(74) *Attorney, Agent, or Firm* — Michele L. Lawson; Smith & Hopen, P.A.

(57) ABSTRACT

An ammonia adsorption product is described which may be used for fresh caught fish and bait. The product may comprise functionalized tectosilicate compound and a buffer. High concentrations of ammonia produced by fish waste can be lethal, even though oxygen availability is rich enough to keep fish breathing. The product is a user-friendly, sustainable, affordable product which is able to extend the life of the fish by safely removing ammonia by an ion-exchange mechanism. This product can convert toxic ammonia into ammonium and uptake ammonium by releasing sodium ions in the water.

17 Claims, 12 Drawing Sheets

Related U.S. Application Data which is a continuation-in-part of application No. 14/997,793, filed on Jan. 18, 2016, now Pat. No. 10,138,143.

(60) Provisional application No. 62/104,398, filed on Jan. 16, 2015.

(51) Int. Cl.
| | |
|---|---|
| *A01K 63/04* | (2006.01) |
| *C02F 1/28* | (2006.01) |
| *B01J 20/16* | (2006.01) |
| *B01J 20/34* | (2006.01) |
| *B01J 20/30* | (2006.01) |
| *B01J 39/14* | (2006.01) |
| *B01J 39/02* | (2006.01) |
| *C02F 103/08* | (2006.01) |
| *C02F 101/16* | (2006.01) |
| *C02F 103/20* | (2006.01) |
| *B01J 20/28* | (2006.01) |

(52) U.S. Cl.
CPC ....... *B01J 20/3071* (2013.01); *B01J 20/3078* (2013.01); *B01J 20/3433* (2013.01); *B01J 39/02* (2013.01); *B01J 39/14* (2013.01); *C02F 1/42* (2013.01); *C02F 1/66* (2013.01); *B01J 20/2805* (2013.01); *C02F 2001/425* (2013.01); *C02F 2101/16* (2013.01); *C02F 2103/08* (2013.01); *C02F 2103/20* (2013.01); *C02F 2303/16* (2013.01)

(56) References Cited

U.S. PATENT DOCUMENTS

| | | | |
|---|---|---|---|
| 5,837,638 | A | 11/1998 | Van Der Stok et al. |
| 8,257,764 | B2 | 9/2012 | Peterson |
| 10,138,143 | B1 * | 11/2018 | Alcantar ............ C02F 1/66 |
| 10,166,528 | B1 * | 1/2019 | Alcantar ............ C02F 1/42 |
| 2018/0194643 | A1 | 7/2018 | Litz et al. |

OTHER PUBLICATIONS

Zhang, A. and P. Perschbacher. Comarison of the Zeolite Sodium Chabazite and Activated Charcoal for Ammonia Control in Sealed Containers. Asian Fisheries Science 16 (2003): 141-145.
Bhatnagar, Amit and Mika Sillanpaa. A review of emerging adsorbents for nitrate removal from water. Chemical Engineering Journal 168 (2011) 493-504.
Bergero, D. et al. Ammonia removal capacity of European natural zeolite tuffs: application to aquaculture waste water. Aquaculture and Fisheries Management 1994, 25, 813-821.
Zhou, Li et al. Total ammonia nitrogen removal from aqueous solutions by the natural zeolite; mordenite: A laboratory test and experimental study. Aquaculture 432 (2014) 252-257.
Emadi, H. et al. In vitro Comparison of Zeolite (Clinoptilolite) and Activated Carbon as Ammonia Absorbants in Fish Culture. Naga, The ICLARM Quarterly, vol. 24, Nos. 1 & 2, Jan.-Jun. 2001.
Lopez-Ruiz, J.L. et al. Zeolites in Marine Nitrogen Transformations. Aquacultural Engineering 13 (1994) 147-152.
Sing, R.K. et al. Water quality management during transportation of fry of Indian major carps, Catla catla (Hamilton), Labeo rohita (Hamilton) and Cirrhinus mrigala (Hamilton). Aquaculture 235 (2004) 297-302.
Aponte-Moreales, Veronica et al. Use of Chabazite to Overcome Ammonia Inhibition During Nitrification of High Strength Wastewater. Proceedings of the Water Environment Federation, 2014. 1431-1442.2014. DOI: 10.2175/193864714815941027.
Ghasemi, Zahra et al. Application of zeolites in aquaculture industry: a review. Reviews in Aquaculture (2018) 10, 75-95.
Colella, C. Ion exchange equilibria in zeolite minerals. Mineral. Deposita 31, 554-562 (1996).
Treacy, M.M.J. and J.M. Gibson. The effects of elastic relaxation on transmission electron microscopy studies of thinned compostiion-modulated materials. Journal of Vacuum Science & Technology B: Microelectronics Processing and Phenomena 4, 1458 (1996). DOI: 10.1116/1583473.
Gendel, Youri and Ori Lahay. A novel approach for ammonia removal from fresh-water recirculated aquaculture systems, comprising ion exchange and electrochemical regeneration. Aquacultural Engineering 52 (2013) 27-38.
Moussavi, Gholamreza et al. The investigation of mechanism, kinetic and isotherm of ammonia and humic acid co-adsorption onto natural zeolite. Chemical Engineering Journal 171 (2011) 1159-1169.
Burgess, R.M. et al. Use of Zeolite for Removing Ammonia and Ammonia-Caused Toxicity in Marine Toxicity Identification Evaluations. Arch. Environ. Contain. Toxicol, 2004. 47, 440-447.
Leyva-Ramos, R. et al. Removal of ammonium from aqueous solution by ion exchange on natural and modified chabazite, Journal of Environmental Management 91 (2010) 2662-2668.
Alshameri, Aref et al. An investigation into the adsorption removal of ammonium by salt activated Chinese (Hulaodu) natural zeolite: Kinetics, isotherms, and thermodynamics. Journal of the Taiwan Institute of Chemical Engineers 45 (2014) 554-564.
Karadag, Dogan et al. Removal of ammonium ion from aqueous solution using natural Turkish clinoptilolite. Journal of Hazardous Materials B136 (2006) 604-609.
Al Dwairi, Reyad A. et al. Potential use of faujasite-phillipsite and phillipsite-chabazite tuff in purification of treated effluent from domestic wastewater treatment plants, Environ Earth Sci (2014) 71:5071-5078. DOI: 10.1007/s12665-013-2911-0.
Smith, Daniel P. Chabazite Biofilter for Enhanced Stormwater Nitrogen Removal. Water Environment Research Apr. 2011, vol. 83, No. 4, pp. 373-384.
Non-final office action dated Sep. 19, 2018 for corresponding U.S. Appl. No. 16/023,396.
Verma, S.S. Wonders of Zeolite. Chemical Business, 2012, 26(2), pp. 10-12.
Non-final office action dated May 14, 2018 for corresponding U.S. Appl. No. 14/997,793.
Durborow, R.M. et al. Ammonia in Fish Ponds. Southern Regional Aquaculture Center, 1992, No. 463.
Final office action dated Sep. 19, 2018 for corresponding U.S. Appl. No. 14/997,793.
Gyrus, Johnsely S. and G.B. Reddy. Sorption and desorption of ammonium by zeolite: Batch and column studies. Journal of Environmental Science and Health Part A (2011) 46, 408-414. DOI: 10.1080/02773813.2010.542398.
Miladinovic, N. et al. Ammonia Removal from Saline Wastewater by Ion Exchange. Water, Air, and Soil Pollution: Focus 4: 169-177, 2004.
Orr, M. et al. What Does That Number Really Mean? Aquarium Water Testing Methods, Results and Interpretation, Sea Scope, 2008, vol. 24, pp. 1-2.

* cited by examiner

A
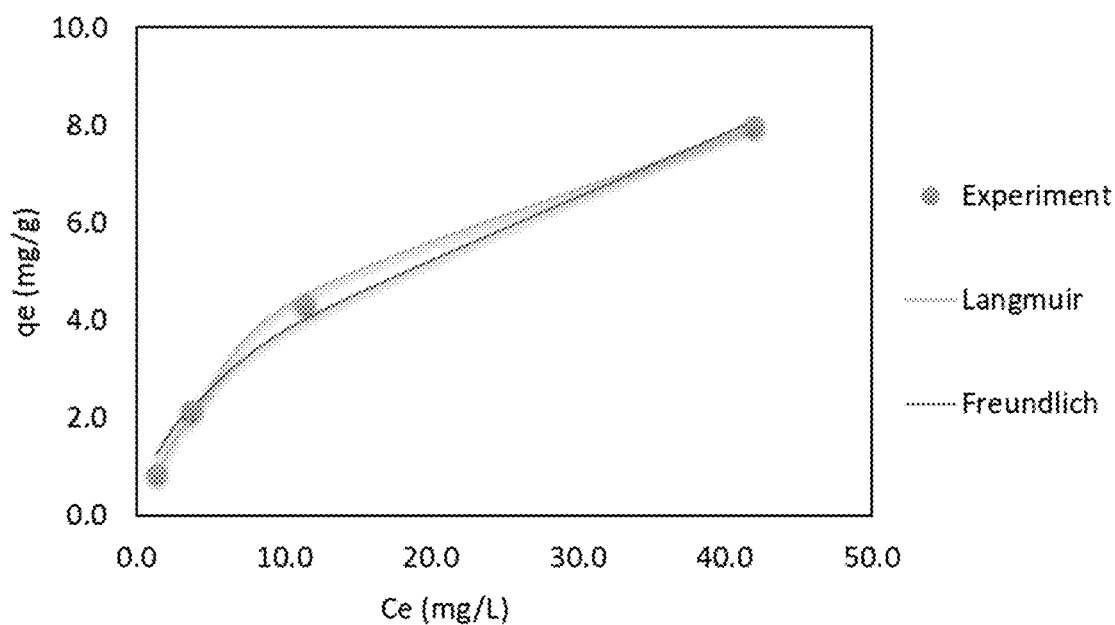
B
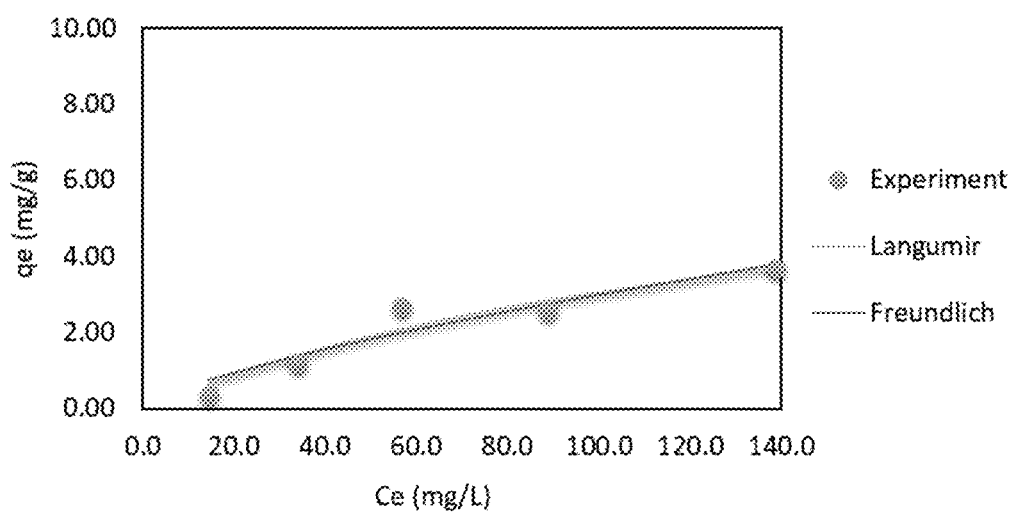
FIG. 5A-B

AMMONIA REMOVAL IN FRESHWATER AND SALTWATER SYSTEMS

CROSS-REFERENCE TO RELATED APPLICATIONS

The present application is a continuation in part of and claims priority to currently pending U.S. Nonprovisional application Ser. No. 16/023,396, filed Jun. 29, 2018, entitled "Ammonia Removal in Freshwater and Saltwater Systems, which claims priority to U.S. Nonprovisional patent application Ser. No. 14/997,793, filed Jan. 18, 2016, entitled "Ammonia Removal in Freshwater and Saltwater Systems", which claims priority to U.S. Provisional Patent Application Ser. No. 62/104,398, filed Jan. 16, 2015, entitled "Ammonia Removal in Freshwater and Saltwater Systems", each of which are incorporated herein by reference their entireties.

FIELD OF THE INVENTION

This invention relates to removal of contaminates from water, and more specifically to systems and methods for removing ammonia from freshwater and saltwater environments to extend the life expectancy of stored fish.

BACKGROUND OF THE INVENTION

Freshwater and saltwater fishing are some of the most popular outdoor activities in the United States and throughout the world. Caught fish are often kept alive by placing the fish in a bucket, livewell, or other container or closed system. In addition, live bait is often used for fishing and must be kept in a similar container prior to use. Because the volume of water is limited in these closed systems, an aeration pump is often installed to replenish dissolved oxygen levels in the water. While aeration systems may maintain oxygen levels in the water to sustain the fish, other contaminates may build up in the closed system and poison the fish. For example, waste products discharged by the fish may increase ammonia concentration in the water and may build to levels that will kill the fish despite an adequate level of dissolved oxygen in the water. Traditional methods to control ammonia in these types of closed systems include lowering the pH of the water or introducing new water to the system (that is, diluting the ammonia concentration).

In a conventional aquarium system, ammonia concentrations can be controlled to below toxic levels by maintaining high dissolved oxygen levels and including reactors that promote biological nitrification. However, in a fresh-caught fish or fish transportation system, the ammonia accumulation rate is faster than the ammonia oxidation rate by nitrification. Therefore, direct removal of ammonia from the water is necessary. Ammonia removal methods include ion exchange, adsorption, chemical neutralization, reverse osmosis, electrochemical reduction-oxidation, air stripping and precipitation (Boyer, 2014; Mook, Chakrabarti, et al., 2012; Peddie, van Teijlingen, et al., 2005; Bhatnagar and Sillanpää, 2011). Among them, the ion exchange process is suitable for fish wastewater applications as it is inexpensive, has an easy operational procedure, and is renewable, especially when using zeolite as the ion exchanger (Emadi, Nezhad, et al., 2001; Bergero, Boccignone, et al., 1994; Zhou and Boyd, 2014; Lopez-Ruiz and Gomez-Garrudo, 1994; Singh, Vartak, et al., 2004). There are many kinds of natural zeolite materials, including clinoptilolite and chabazite. Although clinoptilolite is more abundant and less expensive, chabazite has been reported to have higher ammonia removal efficiency (Aponte-Morales, Payne, et al., 2014). Zeolite traps ammonia and toxic heavy metals in aquaculture wastewater, and it has been intensively studied. Many factors, such as zeolite type, particle size, pretreatment, and wastewater type affect ammonia removal effectiveness (Ghasemi, Sourinejad, et al., 2016).

Accordingly, what is needed in the art is a user friendly, sustainable, cost-effective, and capable system and method for reducing the ammonia level in fresh and saltwater systems.

SUMMARY OF INVENTION

The present invention provides systems and methods for removing ammonia from freshwater and saltwater environments. Various embodiments may comprise a treated, functionalized zeolite compound with a high ammonium absorption capacity. Zeolites are microporous mineral compounds commercially used as adsorbents. The porous structure can accommodate a wide variety of cations such as $Na^+$, $Ca^{2+}$, $K^+$, and $Mg^{2+}$. In addition, once these cations are adsorbed by the zeolite, they can be exchanged for other cations when the zeolite is in contact with a solution containing the other cations. While there are a large number of available zeolites, various embodiments comprise chabazite because it is inexpensive, readily available from many areas of the world, and has a cation-exchange capacity.

In an embodiment, an exemplary method for producing an ammonia removal agent for water environments is presented comprising: obtaining a tectosilicate compound, such as chabazite and functionalizing the compound by soaking the tectosilicate compound in a synthetic saltwater solution for 24 hours and replacing cations in the tectosilicate compound with sodium ions; washing the functionalized tectosilicate compound in deionized water and drying the functionalized tectosilicate compound. The synthetic saltwater solution may consist of the following: 10.780 g/L of sodium; 0.42 g/L of potassium; 1.32 g/L of magnesium; 19.290 g/L of chloride 0.400 g/L of calcium; 0.200 g/L of bicarbonate; 2.66 g/L of sulfate; and 0.241 g/L of alkalinity.

The tectosilicate compound may be washed in deionized water and dried prior to soaking the tectosilicate compound in the synthetic saltwater solution. A shaker table may be used for 24 hours for the washing step in order to remove small particles. The functionalized tectosilicate compound can be dried in an oven at 110° C. for 5 hours. Functionalizing the tectosilicate compound as described may result in an increase of at least 30 percent more sodium in the tectosilicate compound. In addition, the functionalized tectosilicate compound can be regenerated for future use by removing adsorbed ammonium ions and replacing them with sodium ions.

An exemplary method for controlling an ammonia level in a water environment may comprise providing a water environment and a functionalized tectosilicate compound. The functionalized tectosilicate compound may be produced by first obtaining a tectosilicate compound, such as chabazite, and functionalizing the tectosilicate compound by soaking the tectosilicate compound in a synthetic freshwater solution or synthetic salt water solution and removing ions from the tectosilicate compound that have a lower cationic affinity than ammonium ions, such as sodium ions, for compounds soaked in a synthetic freshwater solution, or replacing cations in the tectosilicate compound with sodium ions for compounds soaked in a synthetic salt water solution.

The synthetic freshwater solution may consist of the following: 0.075 g/L of sodium; 0.00312 g/L of potassium;

0.024 g/L of magnesium; 0.193 g/L of chloride; 0.043 g/L of calcium; 0.0048 g/L of bicarbonate; 0.096 g/L of sulfate; and 0.310 g/L of alkalinity.

The synthetic saltwater solution may consist of the following: 10.780 g/L of sodium; 0.42 g/L of potassium; 1.32 g/L of magnesium; 19.290 g/L of chloride 0.400 g/L of calcium; 0.200 g/L of bicarbonate; 2.66 g/L of sulfate; and 0.241 g/L of alkalinity.

The functionalized tectosilicate compound may be washed in deionized water and then dried. A porous container that allows liquid to flow through the container may be provided for the functionalized tectosilicate compound with a solid pH buffer being added to the container holding the functionalized tectosilicate compound. The container of functionalized tectosilicate compound may be placed in a water environment comprising a source of ammonia. The pH buffer may buffer the pH of the system to about 7 and shift an equilibrium between ammonia and ammonium in the water environment towards ammonium, thus allowing the ammonium to be adsorbed by the functionalized tectosilicate. The functionalized tectosilicate compound can be regenerated for future use by removing adsorbed ammonium ions and replacing them with sodium ions.

The tectosilicate compound may be washed in deionized water and dried prior to soaking the tectosilicate compound in the synthetic freshwater or synthetic saltwater solution. The functionalized tectosilicate compound can be dried in an oven at 110° C. for 5 hours. Functionalizing the tectosilicate compound as described using the synthetic saltwater solution may result in an increase of at least 30 percent more sodium in the tectosilicate compound. Functionalizing the tectosilicate compound as described using the synthetic freshwater solution may reduce the percentage of sodium ionically bound to the compound by at least 50 percent.

In an embodiment, a system for removing ammonia from a saltwater environment is presented comprising: a saltwater environment containing ammonia; a functionalized tectosilicate compound that is functionalized by soaking the tectosilicate compound in a synthetic saltwater solution consisting of 10.780 g/L of sodium; 0.42 g/L of potassium; 1.32 g/L of magnesium; 19.290 g/L of chloride 0.400 g/L of calcium; 0.200 g/L of bicarbonate; 2.66 g/L of sulfate; and 0.241 g/L of alkalinity then washing the functionalized tectosilicate compound in deionized water and drying the compound; a pH buffer, such as a solid phosphate buffer like $Na_2HPO_4$ or $NaH_2PO_4$ or a combination thereof, wherein the amount of the pH buffer used is such that the pH buffer maintains a pH of 7 in the saltwater environment; and a container to hold the functionalized tectosilicate compound and the pH buffer, the container comprising a porous material to allow water to flow through the material. The pH of 7 of the water environment shifts the equilibrium between ammonia and ammonium in the water environment towards ammonium, thus allowing the ammonium to be adsorbed by the functionalized tectosilicate. The functionalized tectosilicate compound can be regenerated for future use by removing adsorbed ammonium ions and replacing them with sodium ions. Functionalizing the tectosilicate compound as described using the synthetic saltwater solution may result in an increase of at least 30 percent more sodium in the tectosilicate compound.

BRIEF DESCRIPTION OF THE DRAWINGS

For a fuller understanding of the invention, reference should be made to the following detailed description, taken in connection with the accompanying drawings, in which:

FIG. 5A-B are a series of graphs of the ammonium adsorption nonlinear isotherm in (A) freshwater and (B) saltwater.

DETAILED DESCRIPTION OF THE INVENTION

In the following detailed description of the preferred embodiments, reference is made to the accompanying drawings, which form a part hereof, and within which are shown by way of illustration specific embodiments by which the invention may be practiced. It is to be understood that other embodiments may be utilized, and structural changes may be made without departing from the scope of the invention.

Caught fish are often kept alive by placing the fish in a bucket, livewell, or other container or closed system. In addition, live bait is often used for fishing and must be kept in a similar container prior to use. Because the volume of water is limited in these close systems, an aeration pump is often installed to replenish dissolved oxygen levels in the water. While aeration systems may maintain oxygen levels in the water to sustain the fish, other contaminates may build up in the closed system and poison the fish. For example, waste products discharged by the fish may increase ammonia concentration in the water and may build to levels that will kill the fish despite an adequate level of dissolved oxygen in the water.

Various embodiments may comprise one or more treated, functionalized zeolite compounds with a high ammonium absorption capacity. Zeolites are microporous mineral compounds commercially used as adsorbents. The porous structure can accommodate a wide variety of cations such as $Na^+$, $Ca^{2+}$, $K^+$, and $Mg^{2+}$. In addition, once these cations are adsorbed by the zeolite, they can be exchanged for other cations when the zeolite is in contact with a solution containing the other cations. While there are a large number of available zeolites, various embodiments comprise chabazite because it is inexpensive, readily available from many areas of the world, and has a cation-exchange capacity.

Chabazite (available from St. Cloud Mining Company) is a tectosilicate mineral with the formula $(Ca, Na_2, K_2, Mg)Al_2Si_4O_{12} \cdot 6H_2O$.

The ion selectivity series for chabazite is:

$Ti^+ > K^+ > Rb^+ > NH_4^+ > Pb^{2+} > Na^+ > Ba^{2+} > Sr^{2+} > Ca^{2+} > Mg^{2+} > Li^+$

The ion exchange process occurs when ammonium ions are exchanged by other changeable ions as listed above, such as $Na^+$, $Mg^{2+}$ and $Ca^{2+}$, in the chabazite thus leading to ammonia removal from the water by the functionalized chabazite. Details on the process are described in the Examples.

Figure 1:
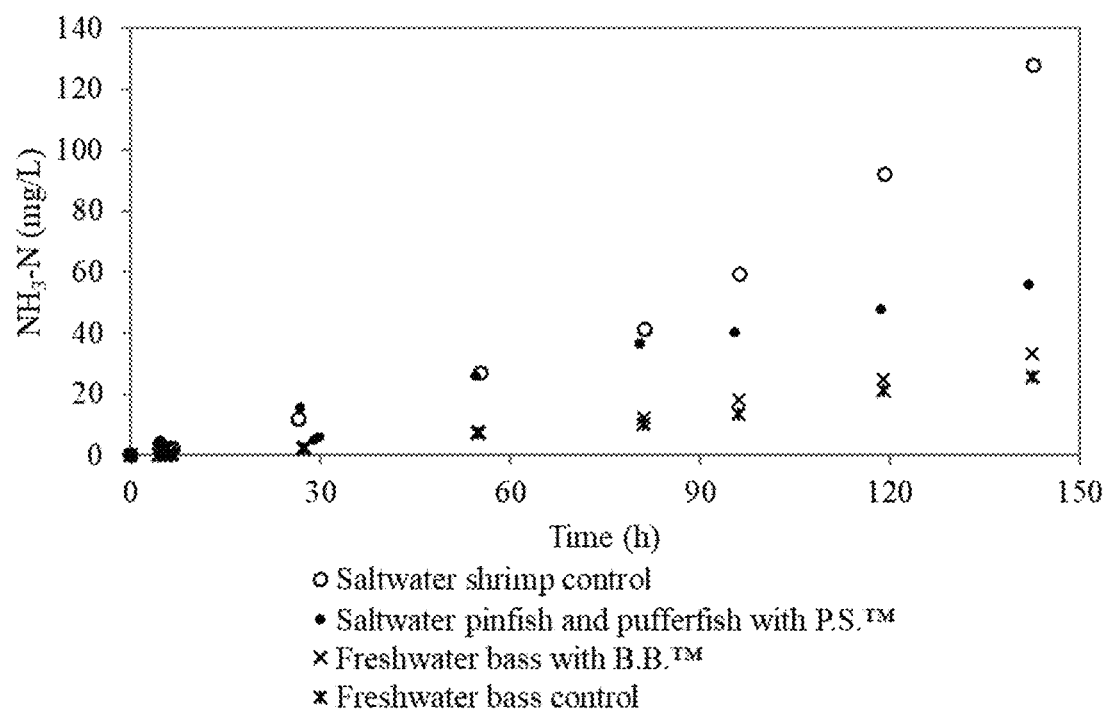
FIG. 1 is a graph of ammonia buildup in a closed aquatic system for a variety of fish.

Experimentation was conducted to determine the ammonia accumulation rate over time for closed systems of various volumes containing live fish in both freshwater and saltwater. These tests involved bass with a commercial water conditioner, bass without the conditioner, pinfish and blowfish, and shrimp. Ammonia concentration was determined using the salicylate method (HACH Method 10031) and the results are shown in FIG. 1. These tests indicated an ammonia accumulation rate of 0.21±0.03 mg $HN_3$—N/specimen/hr for freshwater fish and 0.81±0.17 mg $HN_3$—N/specimen/hr for saltwater fish.

Next, a procedure was developed to treat and functionalize chabazite pellets to maximize ammonium adsorption capacity. Two pretreatment methods were used to develop products specific to freshwater and saltwater uses. Chabazite was the material used to remove ammonia by ion exchange (IX) method. It was purchased from St. Cloud Mining Inc. (Winston, N. Mex.). The grain size range was 1-2 mm. All natural chabazite (NC) grains were washed by deionized (DI) water using a shaker table for 24 hours to remove extremely small particles and then dried in an oven set to 110° C. All washed chabazite were stored in a sealed plastic bottle at room temperature.

For freshwater uses, the washed and dried chabazite was soaked in freshwater/synthetic freshwater for 24 hours to remove sodium ions, then washed with DI water and oven dried at 110° C. for 5 hours. The composition of the synthetic freshwater is provided in Table 1 below.

TABLE 1

| Synthetic Freshwater Composition | |
|---|---|
| Ion | Freshwater (g/L) |
| Sodium ($Na^+$) | 0.075 |
| Potassium ($K^+$) | 0.00312 |
| Magnesium ($Mg^{2+}$) | 0.024 |
| Chloride ($Cl^-$) | 0.193 |
| Calcium ($Ca^{2+}$) | 0.043 |
| Bicarbonate ($HCO_3^-$) | 0.0048 |
| Sulfate ($SO_4^{-2}$) | 0.096 |
| Alkalinity | 0.310 |

For saltwater uses, saltwater modified chabazite (SC) was made from NC soaked for 24 hours in 117 g/L NaCl (2M) to uptake sodium ions where the suspension was shaken using a shaking table for 24 hours. The SC particles were then washed with DI water and dried at 110° C. for 5 hours. The composition of the synthetic saltwater is provided in Table 2 below.

TABLE 2

| Synthetic Saltwater Composition | |
|---|---|
| Ion | Saltwater (g/L)[7] |
| Sodium ($Na^+$) | 10.780 |
| Potassium ($K^+$) | 0.42 |
| Magnesium ($Mg^{2+}$) | 1.32 |
| Chloride ($Cl^-$) | 19.290 |
| Calcium ($Ca^{2+}$) | 0.400 |
| Bicarbonate ($HCO_3^-$) | 0.200 |
| Sulfate ($SO_4^{-2}$) | 2.66 |
| Alkalinity | 0.241 |

The pretreated chabazite was coated in blue dye (PSP0002 Lake and Pond Dye available from Outdoor Water Solutions) so that it could turn the water color blue when it was put into water. The pretreated chabazite was also packed with a phosphate buffer of a fabric tea bag.

Chabazite Regeneration

All used chabazite was oven dried, mixed, and stored separately in covered containers. During the regeneration process, 30 g of used chabazite was immersed in 200 mL of NaCl solution with pH controlled at 7. The NaCl concentrations were 0 g/L ($RE_0$), 40 g/L ($RE_{40}$), and 80 g/L ($RE_{80}$), respectively. The suspension was shaken for varying periods of time and then separated from the supernatant. Aqueous samples were collected from the supernatant to measure desorbed $NH_4^+$—N concentrations. Each test was performed in triplicate. Regenerated chabazite was washed with DI water and then dried at 110° C. before use.

Chabazite Characterization

The chemical composition of natural chabazite were investigated using a Scanning Electron Microscope with Electron Energy-dispersive X-ray spectroscopy (SEM-EDS, Hitachi, Japan). Chabazite was also characterized by comparing the chemical composition and crystalline structure before and after treatment. Chemical composition tests were performed in three 50 mL volumetric flasks. Flasks were filled with 50 mL DI water, synthetic freshwater and 2M NaCl, respectively. The chabazite was pretreated in each flask following the previously described pre-treatment procedure. When pre-treatment was completed, water was collected and filtered. The crystalline structure of chabazite before and after treatment was tested using X-Ray Diffraction (Panalytical, Westborough, Mass.).

Figure 2:
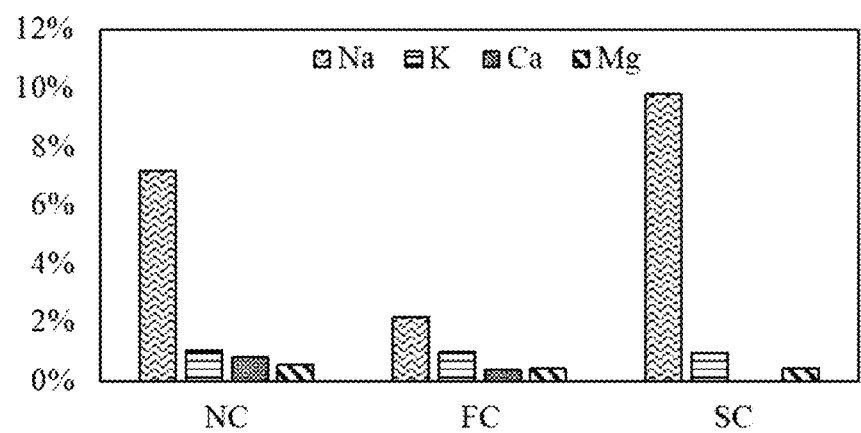
FIG. 2 is a graph of the composition of chabazite before and after pretreatment.

FIG. 2 shows the chemical composition of the chabazite before and after modification. The $Na^+$ composition decreased sharply for the treated freshwater chabazite (CF in FIG. 2) and a less sharp increase in $Na^+$ composition for the saltwater chabazite (CS in FIG. 2). Approximately half of the $Ca^{2+}$ ions were released from the freshwater chabazite and essentially all $Ca^{2+}$ was released from the saltwater chabazite. There was no appreciable change in the $K^+$ and $Mg^{2+}$ composition. In natural zeolite, $Na^+$, $K^+$, $Ca^{2+}$, and $Mg^{2+}$ are exchangeable cations and these cations balance the negative charges by isomorphic substitution of the Al atoms in the framework (Leyva-Ramos, Monsivais-Rocha, et al., 2010). Natural chabazite (NC) has the highest weight percentage of $Na^+$ in the framework compared to other cations. After being modified with synthetic freshwater (FC), the concentration of $Na^+$ decreased from 7.19% to 1.9%. Meanwhile, $Ca^{2+}$ also decreased from 0.8% to 0.3%, $Mg^{2+}$ had a slight reduction (~0.16%), and there were almost no changes in $K^+$ between NC and FC (<0.1%). This phenomenon can be explained by the ion exchange reaction. Ion exchange commonly occurs between liquid and solid phases when there is ion sharing. The process is determined by the ion selectivity and the ion concentrations in both phases (Colella, 1996). The ion selectivity is a function of both the hydrated radius of the ions in solution and the magnitude of the charge (Boyd, Schubert, et al., 1947; Colella, 1996). Since the external ion strength in freshwater is low, the ion exchange process is mainly determined by the cationic affinity. The cationic affinity sequence for chabazite is commonly written as: $K^+>Na^+>NH_4^+>Ca^{2+}>Mg^{2+}$ (Breck, 1973; Barrer, Davies, et al., 1969; Colella, 1996). Therefore, in FC, $Na^+$, $Ca^{2+}$ and $Mg^{2+}$ ions are exchanged during the modification process. This change probably created more residual negative charges on the chabazite framework. The effect of treatment with NaCl solution also showed the same trend as treatment with synthetic freshwater; the only difference was the increase in $Na^+$ in the SC. As the $Na^+$ in the liquid phase is much higher than any other ions in the solid phase, $Na^+$ is easily exchanged. $Ca^{2+}$ decreased to almost zero in this case. This result is reasonable because $Na^+$ and $Ca^{2+}$ have a lower cationic affinity with the chabazite framework.

Figure 3:
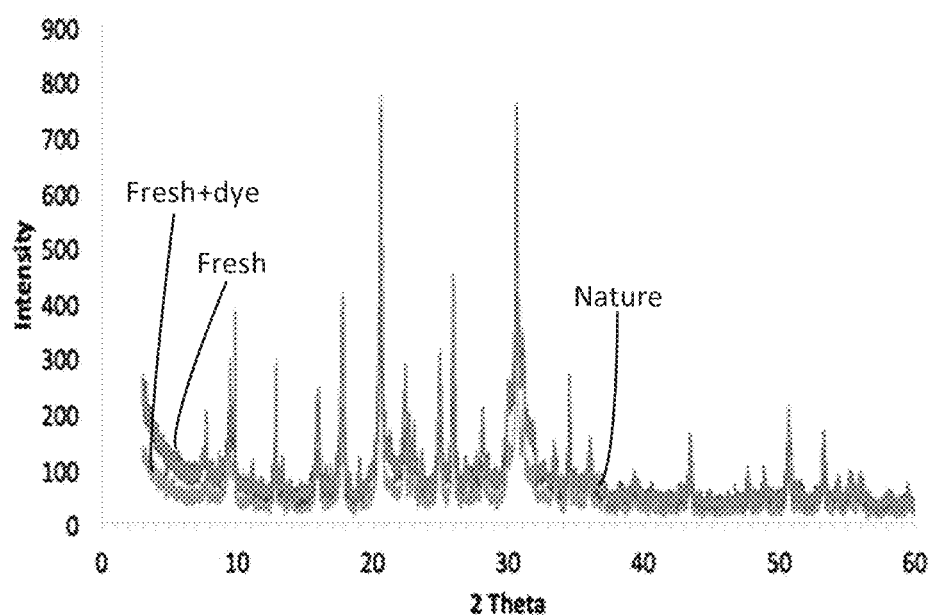
FIG. 3 is an x-ray diffraction plot of chabazite pretreated using freshwater.
Figure 4:
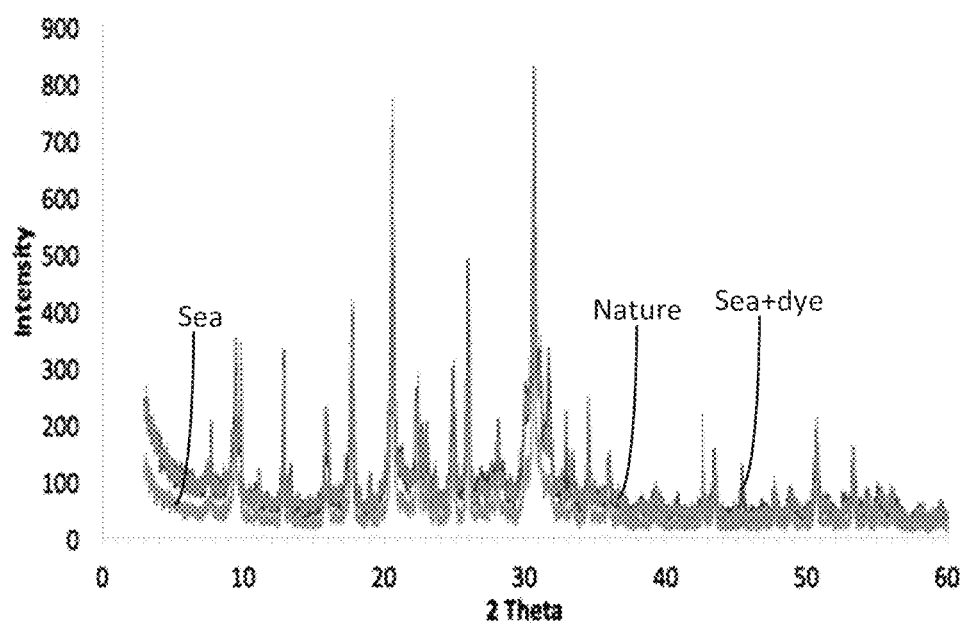
FIG. 4 is an x-ray diffraction plot of chabazite pretreated using 2M NaCl.

FIGS. 3 and 4 illustrate that the crystalline structure of the freshwater chabazite and the saltwater chabazite, respectively, are unchanged after treatment. The chabazite used in this study has the same characteristic peaks as described previously (Treacy, 1986), and those peaks are consistent among NC, FC, and SC. Although SC has a relatively high intensity at the 2θ value of 42.6, this peak still matched with the peak lists of chabazite (Treacy, 1986). The additional peaks evident in FIG. 4 are due to the presence of the blue dye.

Ammonium Adsorption Kinetic and Batch Equilibrium Studies

Bench scale kinetic studies were conducted at room temperature using four 1000 mL containers filled with an ammonium solution. An air pump was used to simulate mixing conditions in fresh caught fish and transportation systems. Initial concentrations of $NH_4Cl$ were 30, 75, 150, 300 mg/L. The $NH_4Cl$ solution was prepared in either synthetic freshwater or seawater. The amount of chabazite was 30 g in each container. Samples were taken every hour until equilibrium was observed.

Adsorption Kinetics

Pseudo-first order and second-order kinetic models were used to analyze the data using the linear forms of Eq. (1) and (2) (Yusof, Keat, et al., 2010; Alshameri, Ibrahim, et al., 2014):

$$\ln(q_e - q_t) = \ln q_e - k_1 t \quad (1)$$

$$\frac{t}{q_t} = \frac{1}{k_2 q_e^2} + \frac{1}{q_e} t \quad (2)$$

$$q_e = (C_0 - C_e)\frac{V}{m} \quad (3)$$

where the variables $q_t$ and $q_e$, represent the amount of ammonium adsorbed (mg/g) at any time t (min) and at equilibrium, respectively; $k_1$ (/min) and $k_2$ (g/mg·min) are the pseudo first-order and second-order adsorption rate constants, respectively; V is the solution volume (L), and m is the chabazite mass (g). The least squares method was applied to predict the best-fit linear solution and parameter values. The initial adsorption rate, h (mg/g·min) at t→0, is defined as:

$$h = k_2 q_e^2 \quad (4)$$

The best fit model was chosen based on the determination coefficient ($R^2$). The fitness of the kinetic models to the experimental data was evaluated by the error index of Marquardt's standard deviation percentage (Δq) which is written as (Ahmaruzzaman and Laxmi Gayatri, 2010):

$$\Delta q(\%) = \sqrt{\frac{\sum [(q_{e,exp} - q_{e,cal})/q_{exp}]^2}{n-1}} \times 100 \quad (5)$$

where n is the number of data points and $q_{e,exp}$ and $q_{e,cal}$ (mg/g) are the experimental and calculated adsorption capacity, respectively. The best fit model was chosen based on the determination coefficient ($R^2$). The fitness of the kinetic models to the experimental data was evaluated by the error index of Marquardt's standard deviation percentage (Δq) which is written as (Ahmaruzzaman and Laxmi Gayatri, 2010):

$$\Delta q(\%) = \sqrt{\frac{\sum [(q_{e,exp} - q_{e,cal})/q_{exp}]^2}{n-1}} \times 100 \quad (5)$$

where n is the number of data points and $q_{e,exp}$ and $q_{e,cal}$ (mg/g) are the experimental and calculated adsorption capacity, respectively.

To better understand the specific adsorption mechanisms involved in the adsorption process, it is necessary to use a molecular diffusion model. The kinetic data can be further fitted with the film diffusion model and a particle diffusion model (Yusof, Keat, et al., 2010):

$$\text{Film diffusion model } \ln\left(1 - \left(\frac{q_t}{q_e}\right)\right) = -k_f t \quad (6)$$

$$\text{Particle diffusion model } \ln\left(1 - \left(\frac{q_t}{q_e}\right)^2\right) = -2k_p t \quad (7)$$

where $k_f$ (hr) and $k_p$ (hr) are the film and particle rate constants, which are calculated from:

$$k_f = D_f \frac{C}{C_z} \text{ hr} \quad (8)$$

$$k_p = D_p \frac{\pi^2}{r^2} \quad (9)$$

where the C and $C_z$ (mg/g) are concentrations of $NH_4^+$—N in the solution and in the chabazite, respectively, D is the diffusion coefficient (m²/min), r is the grain radius of chabazite (m), and h is the thickness of film around chabazite particles ($10^{-6}$ m for poorly stirred solution).

The experimental adsorption kinetic data can also be analyzed using the Morris-Weber equation:

$$q_t = k t^{0.5} + C \quad (10)$$

where k is the coefficient of intraparticle diffusion (mg/g·min$^{0.5}$).

A pseudo-second-order relation had best correlation with the experimental kinetic data in both freshwater and seawater. This finding is the same as most published literature (Yusof, Keat, et al., 2010; Karadag, Koc, et al., 2007). Table 4 lists the results of pseudo-second-order kinetics constants and coefficient data for both freshwater and seawater. The value of Δq is very small, which confirms that the pseudo-second-order kinetic model is the best fit to the experimental data.

From both freshwater and seawater data, some similar trends are seen. The adsorption capacity ($q_{e,exp}$) increased with increasing initial ammonium concentration. The high initial concentration of ammonium provided a powerful driving force to overcome mass transfer resistance from solution to the adsorbent; therefore, adsorption of a higher number of ammonium molecules onto a given amount of chabazite will increase the adsorption capacity (Tsai, Hsien, et al., 2009; Moussavi, Talebi, et al., 2011). In comparison with freshwater, $q_{e,exp}$ in seawater was about half of $q_{e,exp}$ in freshwater. The cations in seawater also interacted with the zeolite, decreasing the ability of ammonium ions to bind freely (Burgess, Perron, et al., 2004). Another important finding from Table 5 is that the rate constant, ($k_2$), decreased, while the initial adsorption rate (h) increased with increasing initial ammonium concentration. This also shows that the mass transfer rate of ammonium ions improved with increasing initial ammonium concentration (Moussavi, Talebi, et al., 2011).

The third finding can be combined with the equilibrium removal of ammonium. The kinetic studies were conducted for 270 mins, but only 30 mins were needed for an equilibrium concentration to be achieved. The same phenomena can be found in other literature (Burgess, Perron, et al., 2004; Huang, Xiao, et al., 2010; Alshameri, Ibrahim, et al., 2014; Karadag, Koc, et al., 2006; Du, Liu, et al., 2005). The most probable explanation is that ammonium diffused onto the external surface of the chabazite, which was followed by pore diffusion into the intraparticle surfaces to attain equilibrium. The key driving force in this case is the difference in the adsorbed concentration of ammonium at chabazite surface ($q_e$) and the solution $q_t$ (Ho, Chiang, et al., 2005; Alshameri, Ibrahim, et al., 2014). The ion exchange capacity is proportional to the number of active ion exchange sites at chabazite (Wen, Ho, et al., 2006; Alshameri, Ibrahim, et al., 2014). The pseudo-second-order kinetic model involves three steps of ion exchange. In the first step ammonium ions diffuse from the liquid phase to the liquid-solid interface (film diffusion), and then the ammonium ions move from the liquid-solid interface to the solid phase of the adsorbent (pore diffusion). Finally, the ammonium ions diffuse into the interparticle pores (Liao, Ismael, et al., 2012; Wang, Shu, et al., 2011; Alshameri, Ibrahim, et al., 2014).

A plot of the intraparticle diffusion model (Eq. 10) confirmed that the sorption processes includes both film diffusion and pore diffusion (Moussavi, Talebi, et al., 2011; Vadivelan and Vasanth Kumar, 2005). The contribution of each step can be further studied by looking at the value of the particle diffusion coefficient ($D_p$) and film diffusion coefficient ($D_f$) (Table 6). The value of $D_p$ for freshwater is higher than the value of $D_f$, but opposite relations are observed in the seawater. This shows that in freshwater, film diffusion is the dominant mechanism in the adsorption rate. In seawater, pore diffusion dominated the rate of sorption. For the sorption process, film diffusion controls when the system has poor mixing, and dilute adsorbate concentration. In contrast, pore diffusion controls the sorption process when the adsorbate has low affinity for the adsorbent (Vadivelan and Vasanth Kumar, 2005). $Na^+$ has a relatively lower affinity than $K^+$, therefore it is reasonable to have greater pore diffusion in seawater.

TABLE 3

Pseudo-second-order kinetic parameters for ammonium removal in both freshwater and seawater

| Water type | $NH_4^+$—N concentration (mg/L) | Pseudo-second-order | | | | | |
|---|---|---|---|---|---|---|---|
| | | $k_2$ (g/mg · min) | h (mg/g · min) | $q_{e,\,exp}$ (mg/g) | $q_{e,\,cal}$ (mg/g) | $R^2$ | Δq (%) |
| Freshwater | 10 | 12.59 | 1.14 | 0.30 | 0.30 | 1.00 | 0.17 |
| | 30 | 0.43 | 0.36 | 0.92 | 0.91 | 1.00 | 0.43 |
| | 50 | 0.39 | 0.88 | 1.50 | 1.49 | 1.00 | 0.24 |
| | 100 | 0.16 | 1.25 | 2.77 | 2.74 | 1.00 | 0.35 |
| Seawater | 10 | 2.11 | 0.07 | 0.18 | 0.17 | 0.99 | 1.71 |
| | 30 | 0.51 | 0.09 | 0.41 | 0.40 | 0.99 | 1.03 |
| | 50 | 0.58 | 0.11 | 0.43 | 0.41 | 0.99 | 1.60 |
| | 100 | 0.15 | 0.13 | 0.91 | 0.87 | 0.99 | 1.67 |

TABLE 4

Diffusion kinetic parameters for ammonium removal in both freshwater and seawater

| Water type | $NH_4^+$—N concentration (mg/L) | Film diffusion, $D_f(m^2/min)$ | Particle diffusion, $D_p(m^2/min)$ | Intraparticle transport, k (mg/g · $min^{0.5}$) |
|---|---|---|---|---|
| Freshwater | 10 | $2.39 \times 10^{-11}$ | $8.58 \times 10^{-10}$ | 0.0003 |
| | 30 | $2.74 \times 10^{-11}$ | $9.97 \times 10^{-10}$ | 0.0109 |
| | 50 | $2.14 \times 10^{-11}$ | $7.75 \times 10^{-10}$ | 0.0116 |
| | 100 | $2.69 \times 10^{-11}$ | $1.05 \times 10^{-9}$ | 0.0271 |
| Seawater | 10 | $2.38 \times 10^{-7}$ | $4.08 \times 10^{-15}$ | 0.0042 |
| | 30 | $6.08 \times 10^{-8}$ | $1.28 \times 10^{-15}$ | 0.0082 |
| | 50 | $6.13 \times 10^{-8}$ | $1.46 \times 10^{-15}$ | 0.0067 |
| | 100 | $5.12 \times 10^{-8}$ | $1.36 \times 10^{-15}$ | 0.0201 |

Adsorption Isotherm Studies

Four isotherm models: Langmuir, Freundlich, Temkin, and Sips were studied to describe the solid-liquid adsorption data (Table 5). The parameters and the thermodynamic assumptions of these equations describe the sorption mechanisms, surface properties and affinities of the sorbents in detail (Ho, Chiu, et al., 2005).

TABLE 5

Non-linear and linear forms of Langmuir, Freundlich, Temkin and Sips isotherm models

| | Non-linear form | Linear form |
|---|---|---|
| Langmuir | $q_e = \dfrac{q_o \cdot b \cdot C_e}{(1 + b \cdot C_e)}$ | $\dfrac{C_e}{q_e} = \dfrac{1}{q_0} \cdot C_e + \dfrac{1}{q_0 \cdot b}$ |
| Freundlich | $q_e = K \cdot C_e^{\frac{1}{n}}$ | $\log q_e = \log K + \dfrac{1}{n} \cdot \log C_e$ |
| Temkin | $q_e = \dfrac{RT}{b_t} \ln(A_t \cdot C_e)$ | $q_e = \dfrac{RT}{b_t} \ln A_t + \dfrac{RT}{b_t} \ln C_e$ |
| Sips | $q_e = \dfrac{K_s \cdot C_e^{\beta s}}{1 + \alpha_s \cdot C_e^{\beta s}}$ | $\beta_s \ln C_e = -\ln\left(\dfrac{K_s}{q_e}\right) + \ln(\alpha_s)$ |

In Table 5, $q_e$ is the equilibrium amount of ammonium adsorbed (mg/g), which is experimentally determined from the difference between the initial concentration, $C_0$ (mg/L), and the final $NH_4^+$—N concentrations, $C_e$ (mg/L), at equilibrium using Eq. (5), $q_o$ is the maximum monolayer adsorption capacity (mg/g), b is the Langmuir adsorption constant of $NH_4^+$—N(L/mg) (Foo and Hameed, 2010). K is the Freundlich adsorption capacity parameter ((mg/g)(L/mg)$^{1/n}$), 1/n is the Freundlich adsorption intensity parameter (unitless), R is the universal gas constant (8.314 J/mole K), T is the absolute temperature during the experiment (296K), $b_t$ is the Temkin constant (J/mole), and $A_t$ is the Temkin isotherm equilibrium binding constant (L/g) (Foo and Hameed, 2010), $K_s$ and $a_s$ are the Sips isotherm model constant (L/g), and $\beta_s$ is the Sips model exponent (Foo and Hameed, 2010).

The least square method was used to calculate all isotherm parameters. In the linear regression model, a linear coefficient of determination, $R^2$, was used to examine the accuracy of the model fit. The non-linear regression was established by iterative non-linear least square fitting using the solver add-in in Microsoft Excel (Brown, 2001). The coefficient of determination, $R^2$, and chi-square, $\chi^2$ tests were used to evaluate the fit of the non-linear isotherm to the experimental data. The equivalent mathematical statement of chi-square is:

$$\chi^2 = \sum \frac{(q_e - q_{e,m})^2}{q_{e,m}} \quad (11)$$

where $q_{e,m}$ is the equilibrium capacity obtained by the model (mg/g). If $\chi^2$ is a small number, the data from the model are similar to the experimental data; if $\chi^2$ is large, the model data are different from the experimental data (Ho, Chiu, et al., 2005).

Regeneration Efficiency Studies

The regeneration efficiency (RE) of chabazite was calculated using Eq. (12):

$$RE\ (\%) = \frac{q'_e}{q_e} * 100 \quad (12)$$

where $q_e'$ (mg/g) is the amount of ammonium absorbed by the regenerated chabazite at equilibrium.

The study of adsorption isotherms can aid in the design and operation of ammonia removal systems. The obtained values for the isotherm model parameters using linear and non-linear regression in freshwater are listed in Table 6. All non-linear regressions had a better fit than the linear regressions (with higher $R^2$). This is reasonable because the alterations of the linear regression form have the tendency to create a higher error distribution (Karadag, Koc, et al., 2007; Foo and Hameed, 2010). The highest correlation was found in non-linear regression in the Sips isotherm, with an $R^2$ value of 0.99 and $\chi^2$ value of 0.01. The Sips isotherm is a combination of the Langmuir and Freundlich isotherms (Foo and Hameed, 2010). It is used to predict the heterogeneous adsorption systems by avoiding the limitations of the Freundlich isotherms (Günay, Arslankaya, et al., 2007; Foo and Hameed, 2010). From the previously obtained adsorption kinetic result, we find that the ammonium adsorption onto chabazite was not a simple monolayer adsorption. The transmigration of ammonium ions happened on the surface of chabazite. Therefore, the Langmuir isotherm (monolayer adsorption isotherm (Dada, Olalekan, et al., 2012; Karadag, Koc, et al., 2007; Foo and Hameed, 2010)) is not the best isotherm model to predict this adsorption phenomenon. The Sips isotherm confirms that the ammonium adsorption onto modified chabazite under freshwater is a complex process that a simplified isotherm model.

Nevertheless, the Langmuir isotherm still fits with experimental data with a high $R^2$ value of 0.99 and low $\chi^2$ value of 0.03. The $q_o$ value was determined to be 11.1 mg/g, which is smaller than the $q_o$ reported in other literature (Table 7). One probable reason for the low maximum ion adsorption capacity in this study was the testing protocol. In prior literature, batch reactors had constant mixing (Lahav and Green, 1998; Cyrus and Reddy, 2011) or were mixed 3-4 times daily (Leyva-Ramos, Monsivais-Rocha, et al., 2010). In this study, the mixing energy of chabazite and water was provided by water turbulence generated from aeration only, which is weaker compared with constant shaking. The second probable reason was the diversity of particle size. It has been found that smaller particle size would have higher ammonium adsorption capacity (Hedstrom, 2004; Cyrus and Reddy, 2011; Wen, Ho, et al., 2006).

Table 8 lists the obtained isotherm parameters using linear and non-linear regression in seawater. Non-linear models were better than linear models in this case. Under seawater conditions, both Temkin and Sips isotherms fit the experimental data, with an $R^2$ value of 0.94 and an $\chi^2$ value of 0.01. The Temkin isotherm includes a factor that takes into account the interaction of adsorbent and adsorbate (Dada, Olalekan, et al., 2012). In consideration of the characteristics of the Sips and Temkin isotherms, it is clear that the ammonium adsorption in seawater is complex. The non-linear Langmuir isotherm also had a relatively good fit with the an $R^2$ of 0.92 and an $\chi^2$ of 0.03. The maximum ammonia adsorption capacity ($q_o$) in seawater was 7.80 mg/g. This low value also reveals that strong competing ion competition occurred during the adsorption process in seawater. Zeolite used to remove ammonia is seldom studied in marine water due to the competing ions present. However, in this study, the ammonium removal efficiency was 48.6±5.91%, which is much higher than 18.1±2.47% reported by Miladinovic et. al. (Miladinovic, Weatherley, et al., 2004) and 18% reported by Burgess et. Al. (Burgess, Perron, et al., 2004). Emadi et al. also reported an ammonium removal efficiency of 58.8% when the initial NH$_4$Cl was 5 mg/L (Emadi, Nezhad, et al., 2001); however, in their study, NaCl was used instead of synthetic seawater. This will eliminate many other competing ions such as $Ca^{2+}$, $K^+$, and $Mg^{2+}$.

TABLE 6

Adsorption isotherms parameters estimated by linear and non-linear regression in freshwater

| Isotherm | Parameters | Linear | Non-linear |
|---|---|---|---|
| Langmuir | $q_o$ | 10.83 | 11.10 |
|  | b | 0.07 | 0.06 |
|  | $R^2$ | 0.99 | 0.99 |
|  | $\chi^2$ | — | 0.03 |
| Freundlich | K | 0.85 | 1.10 |
|  | 1/n | 0.63 | 0.54 |
|  | $R^2$ | 0.98 | 0.99 |
|  | $\chi^2$ | — | 0.14 |
| Temkin | $b_t$ | 1195.21 | 1195.20 |
|  | $A_t$ | 0.94 | 0.94 |
|  | $R^2$ | 0.97 | 0.97 |
|  | $\chi^2$ | — | 0.58 |
| Sips | $\beta_a$ | 0.63 | 0.847 |
|  | $a_f$ | 1.08 | 0.061 |
|  | $K_s$ | 0.92 | 0.829 |
|  | $R^2$ | 0.98 | 0.99 |
|  | $\chi^2$ | — | 0.01 |

TABLE 7

The maximum ammonium adsorption capacity (qo) data for chabazite from other literature literature

| Size | Modification | Water type | $q_o$ (mg/g) | Reference |
| --- | --- | --- | --- | --- |
| 1-2 mm | Freshwater | Freshwater | 11.10 | Current study |
| 0.18 mm | No | — | 32.20 | (Leyva-Ramos, Monsivais-Rocha, et al., 2010) |
| 0.18 mm | NaCl | — | 37.24 | (Leyva-Ramos, Monsivais-Rocha, et al., 2010) |
| — | No | Secondary wastewater | 41.50 | (Lahav and Green, 1998) |
| 1 mm | No | Swine wastewater | 10.84 | (Cyrus and Reddy, 2011) |
| 2-4 mm | No | Swine wastewater | 10.28 | (Cyrus and Reddy, 2011) |

TABLE 8

Adsorption isotherms parameters by linear and non-linear regression in seawater

| Isotherm | Parameters | Linear | Non-linear |
| --- | --- | --- | --- |
| Langmuir | $q_o$ | 38.91 | 7.80 |
| | b | 0.001 | 0.006 |
| | $R^2$ | 0.024 | 0.92 |
| | $\chi^2$ | — | 0.03 |
| Freundlich | K | 0.027 | 0.11 |
| | 1/n | 1.038 | 0.72 |
| | $R^2$ | 0.92 | 0.90 |
| | $\chi^2$ | — | 0.06 |
| Temkin | $b_t$ | 1674.68 | 1674.70 |
| | $A_t$ | 0.082 | 0.082 |
| | $R^2$ | 0.94 | 0.94 |
| | $\chi^2$ | — | 0.01 |
| Sips | $\beta_a$ | 1.038 | 1.86 |
| | $a_f$ | 2.95 | 0.001 |
| | $K_e$ | 0.08 | 0.003 |
| | $R^2$ | 0.92 | 0.94 |
| | $\chi^2$ | — | 0.01 |

The ammonium adsorption isotherm using the Langmuir and Freundlich models were then determined for both the freshwater and saltwater chabazite. This testing was performed using the synthetic freshwater characterized in Table 1 and synthetic saltwater characterized in Table 2. The ammonium adsorption isotherm results are presented in FIGS. 5A and 5B (nonlinear isotherm) and Table 9 below.

TABLE 9

Isotherm Constants for Ammonium Adsorption in Both Freshwater and Saltwater

| | | Langmuir | | | Freundlich | |
| --- | --- | --- | --- | --- | --- | --- |
| | | $q_o$ (mg/g) | b (L/mg) | $R^2$ | K | 1/n | $R^2$ |
| Linear | Freshwater | 10.83 | 0.07 | 0.99 | 0.85 | 0.63 | 0.98 |
| | Saltwater | 38.91 | 0.001 | 0.024 | 0.027 | 1.038 | 0.92 |
| Non-linear | Freshwater | 11.10 | 0.06 | 0.99 | 1.10 | 0.54 | 0.99 |
| | Saltwater | 7.80 | 0.006 | 0.92 | 0.11 | 0.72 | 0.90 |

Figure 6:
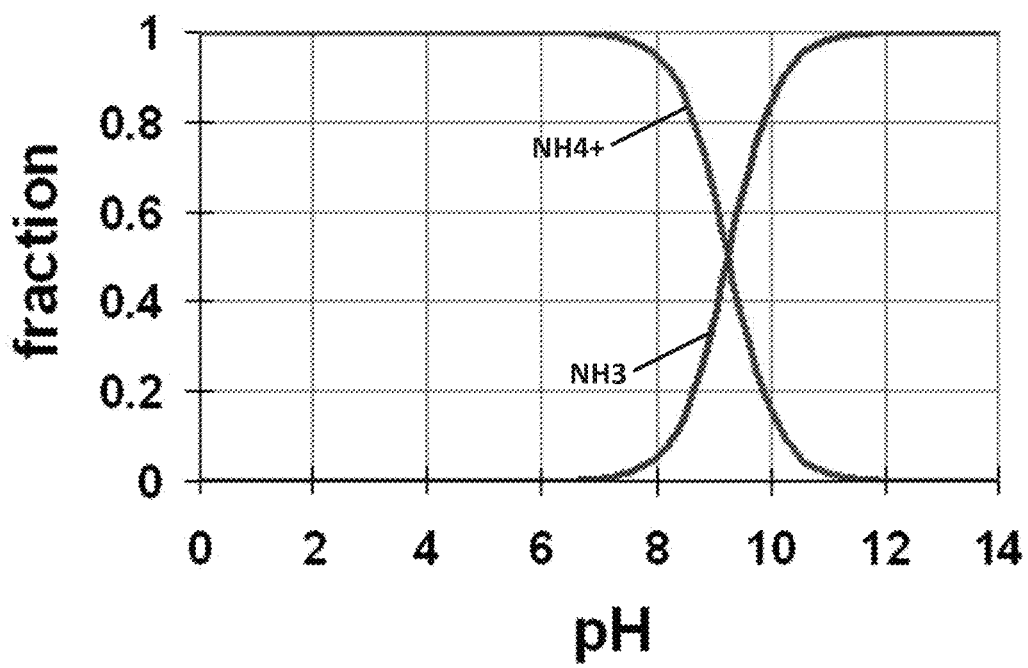
FIG. 6 illustrates the relationship of ammonia to ammonium concentration as a function of pH.

Proper pH control may be used to affect the ammonia chemistry according to the equation $NH_3+H^+\leftrightarrow NH_4^++H_2O$. The higher the pH, the more the equilibrium moves to the left, favoring ammonia formation. The lower the pH, the more the equilibrium is shifted to the right, favoring ammonium formation. As shown in FIG. 6, a pH of about 7 favors essentially 100 percent formation of ammonium. To achieve a pH of 7, a phosphate buffer comprising $Na_2HPO_4$ and $NaH_2PO_4$ were added to both the freshwater and saltwater chabazite. Alternatively, $K_2HPO_4$ and $KH_2PO_4$ (2 g each) can be added to both the freshwater and saltwater chabazite. In various embodiments, spent chabazite may be regenerated by removing the adsorbed ammonium ions and replacing them with sodium ions (or other suitable ions).

Analytical Methods

Ammonia concentrations were measured using the salicylate method (HACH method 10023, Loveland, Colo.) and a high-performance ammonia ion selective electrode (Fisher Scientific, Pittsburgh, Pa.). pH values were measured using a Denver Instrument Model 250 pH meter (Bohemia, N.Y.). Cation concentrations ($Na^+$, $K^+$, $Mg^{2+}$, and $Ca^{2+}$) were detected by Ion Chromatography (IC, Metrohn 850, Switzerland).

Ammonia concentrations were measured using the salicylate method described previously and the accumulation rate (k) was calculated based on zero order kinetics:

$$C=C_0+kt \quad (13)$$

where C (mg/L) is the ammonia concentration at time t (hour), and $C_0$ is the initial ammonia concentration (mg/L).

Example 1—In Vitro Test of Ammonia Removal

Two fish aeration systems were filled with 10 L of synthetic water. Each system included a 13 L container and an air pump. The $NH_4Cl$ solution was pumped into each system at a specified rate calculated from the aforementioned experiment. This design was used to simulate the condition as fish exit in the system. The ammonia removal agent (freshwater chabazite) was added into one aeration system. The other one was set up as a control group. Samples were taken every hour for 24 hours.

Ammonia concentrations of water samples were tested by high performance ammonia ion selective electrode (Fisher Scientific, Pittsburgh, Pa.). The ammonia removal efficiency (%) is calculated based on the final ammonia concentration in the control group ($C_{control}$) and the experiment group ($C_{experiment}$) by Equation 14:

$$\frac{c_{control} - c_{experiment}}{c_{control}} \times 100 \quad (14)$$

Previous trials of in-vitro experiments have found that no ammonia removal was observed when only phosphate buffer was added (ammonia removal efficiency of zero). In addition, if the functionalized chabazite is only added once in the beginning of an experiment, there was no ammonia removal after 24 hours (data not shown). The majority of ammonium adsorption by using chabazite only takes places during the very first hour. After that, the ammonium adsorption is slow. To enhance the ammonia removal performance, the ammonia removal agent was added to the containers every three hours.

Product preparation steps for the functionalized chabazite are summarized as follows:

Freshwater Chabazite
1. Chabazite (30 g) pretreated by synthetic freshwater at for 24 hrs (200 mL synthetic freshwater and 1 mL 5 g/L blue dye solution).
2. Wash by DI water and dry in the oven at between 100° C. to 110° C. for 5 hours (110° C. preferred).
3. Pack in a porous bag (30 g per bag) with a solid phosphate buffer, e.g. 0.8 $Na_2HPO_4$ and 0.3 g $NaH_2PO_4$ as solids.

Saltwater Chabazite
1. Chabazite (30 g) pretreated by 2M NaCl for 24 hrs (200 mL 2M NaCl and 1 mL 5 g/L blue dye solution).
2. Wash by DI water and dry in the oven at between 100° C. to 110° C. for 5 hours (110° C. preferred).
3. Pack in a porous bag (30 g per bag) with a solid phosphate buffer, e.g. 0.8 $Na_2HPO_4$ and 0.3 g $NaH_2PO_4$ as solids.

Figure 7:
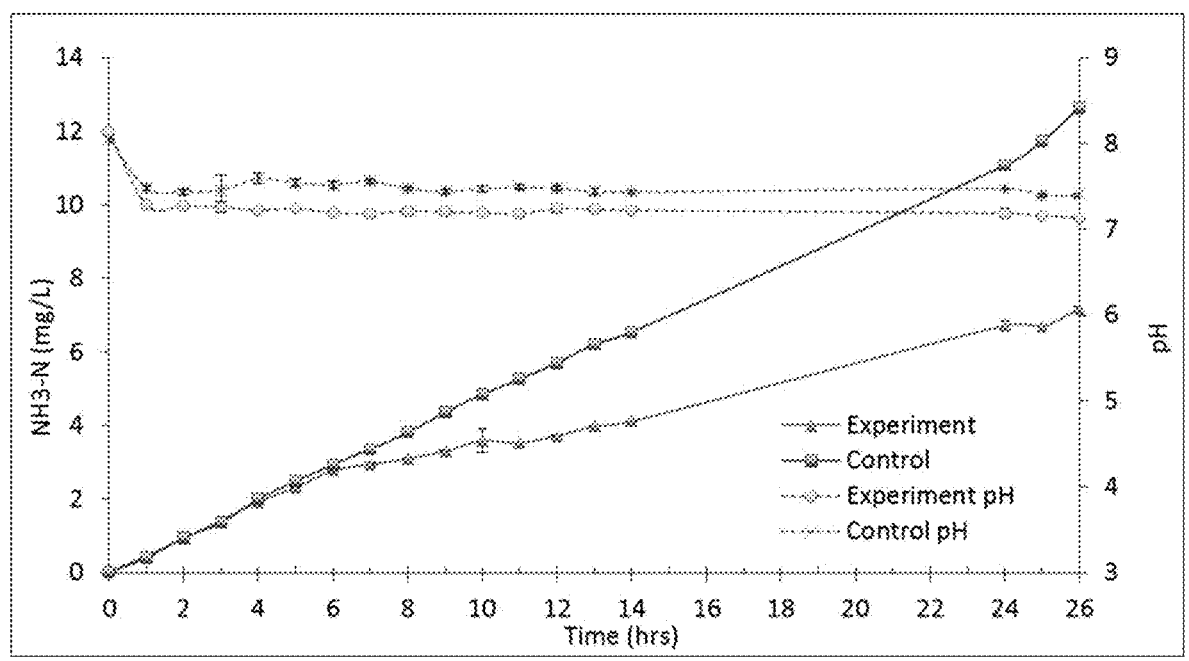
FIG. 7 is a graph of ammonia concentration for an in-vitro experiment.
Figure 8:
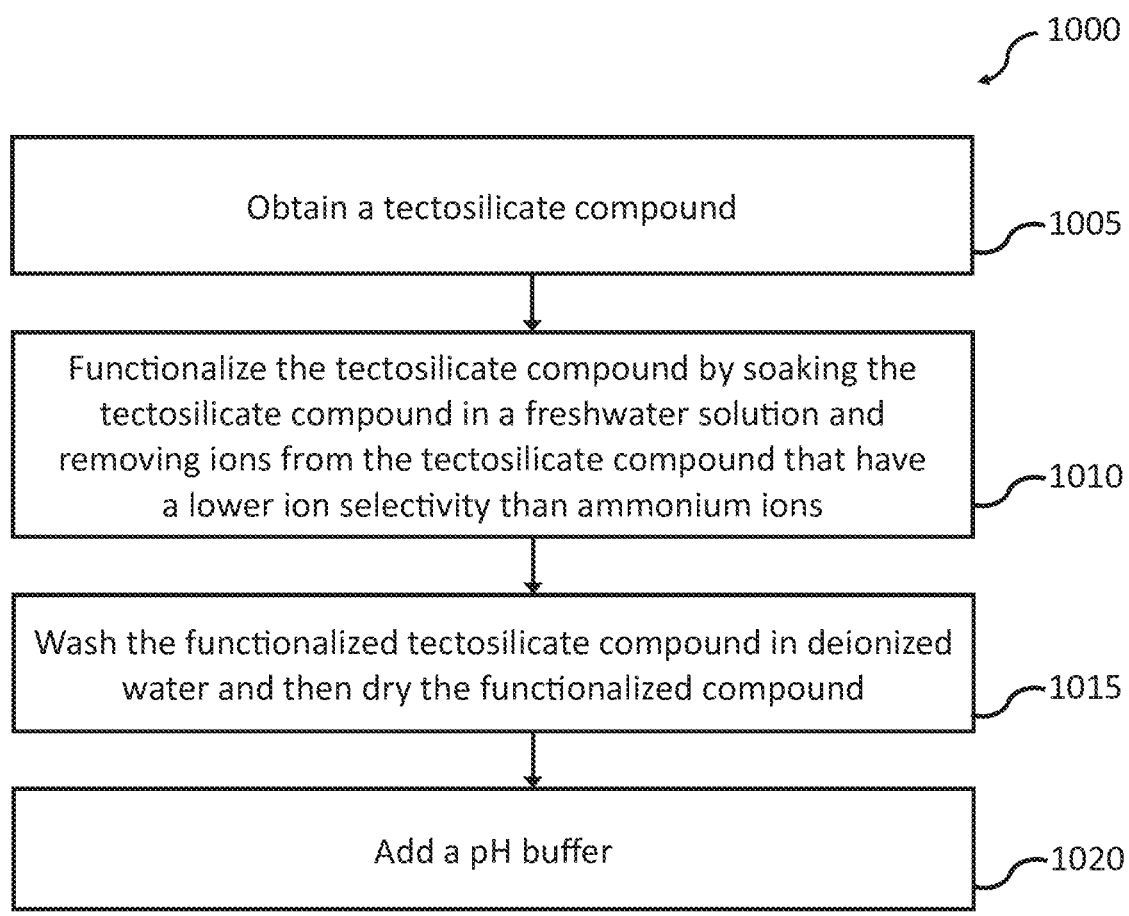
FIG. 8 is a flowchart of an exemplary method for producing an ammonia removal agent for water environments.
Figure 9:
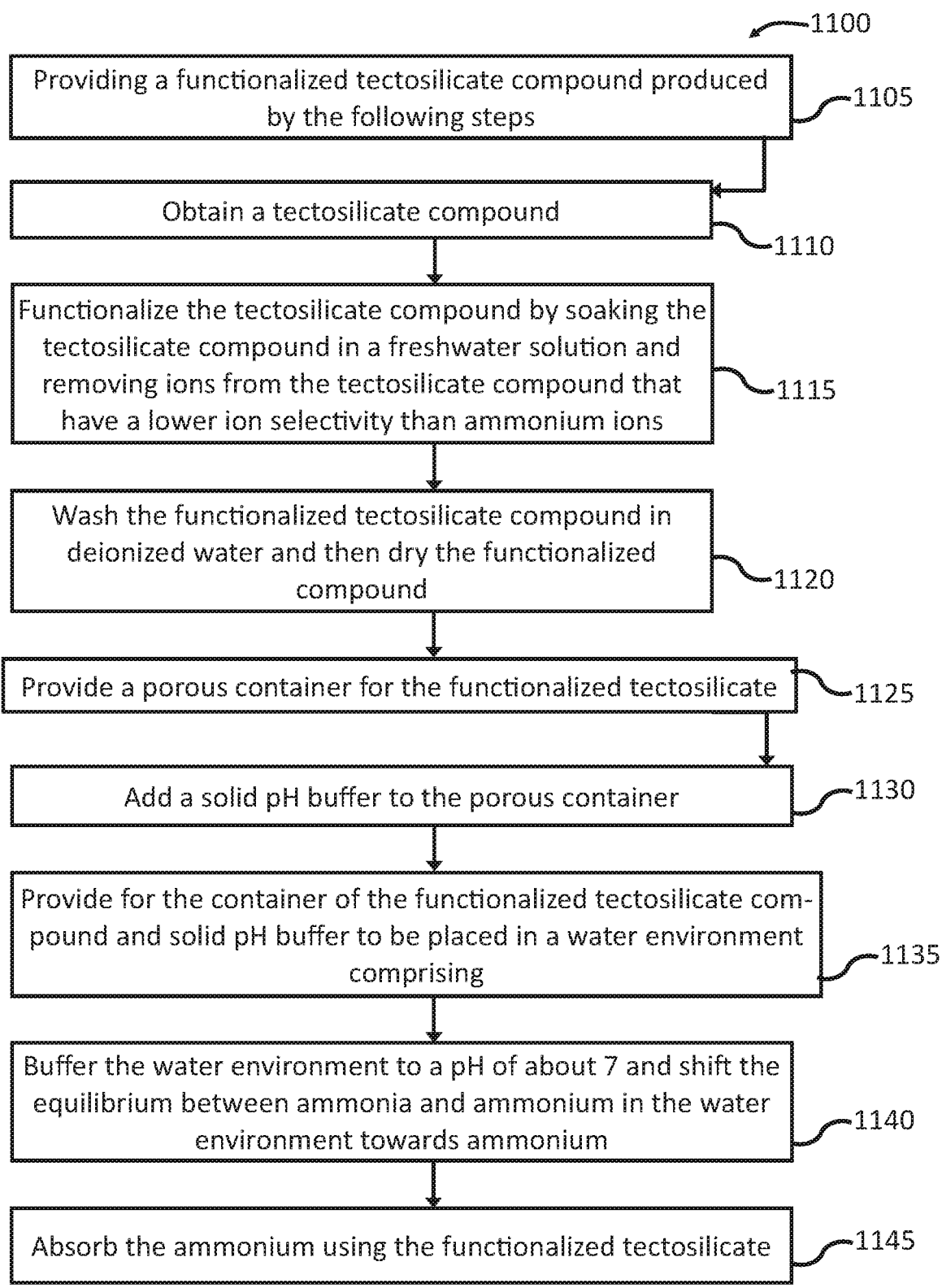
FIG. 9 is a flowchart of an exemplary method for controlling an ammonia level in a water environment.

Using the above preparation steps, porous containers of the freshwater or saltwater chabazite were prepared and an in-vitro test was conducted using synthetic freshwater or saltwater, respectively. As used herein, "seawater" and "saltwater" are used interchangeably. A high-performance ammonia ion selective electrode was used to measure ammonia concentration in a container with the freshwater or saltwater chabazite in a porous bag and a control. Aeration was used in both. The experimental results for freshwater chabazite are shown in FIG. 7. For the experimental specimen, $k_{experimental}$=0.25±0.02 mg $NH_3$—N/L/h. For the control specimen, $k_{control}$=0.47±0.01 mg $NH_3$—N/L/h.

The result of ammonia removal efficiency under in-vitro comparison is listed in Table 10. In freshwater conditions, the average k in control group is 0.38±0.07 mg/L/h, while the k of freshwater chabazite amended tanks is as low as 0.25±0.02 mg/L/h (p-value 0.0025). In freshwater conditions, freshwater chabazite has high ammonia removal efficiency at about 39.25%±1.27% with the highest efficiency achieved being about 43.22%. In seawater conditions, due to the competing ions in the seawater, the ammonia removal efficiency of saltwater chabazite is lower than it is in the freshwater, however it still has a removal efficiency of about 24.56%±1.85% with highest efficiency achieved being about 26.54%. These results reveal that ion exchange is capable of removing ammonia in simulated fish conditions. Meanwhile, adding the ammonia removal agent more frequently can enhance the total ammonia removal efficiency.

TABLE 10

Ammonia removal efficiency

| | Ammonia removal efficiency (%) | |
|---|---|---|
| | Freshwater | Saltwater |
| Functionalized Chabazite | 43.22 | 26.54 |

Example 2—In Vivo Test of Ammonia Removal

Product preparation steps for freshwater and saltwater chabazite are summarized below:

Freshwater Chabazite
1. Chabazite (30 g) pretreated by synthetic freshwater at for 24 hrs (200 mL synthetic freshwater and 1 mL 5 g/L blue dye solution).
2. Wash by DI water and dry in the oven at between 100° C. to 110° C. for 5 hours (110° C. preferred).
3. Pack in a porous bag (30 g per bag) with a solid phosphate buffer, e.g. 0.8 $Na_2HPO_4$ and 0.3 g $NaH_2PO_4$ as solids.

Saltwater Chabazite
1. Chabazite (30 g) pretreated by 2M NaCl for 24 hrs (200 mL 2M NaCl and 1 mL 5 g/L blue dye solution).
2. Wash by DI water and dry in the oven at between 100° C. to 110° C. for 5 hours (110° C. preferred).
3. Pack in a porous bag (30 g per bag) with a solid phosphate buffer, e.g. 0.8 $Na_2HPO_4$ and 0.3 g $NaH_2PO_4$ as solids.

In-vivo tests were performed using live fish in an experimental container with the prepared chabazite and live fish in a container without chabazite as a control. Aeration was used in both. Prepared chabazite was added into water every three hours. Testing was performed for both freshwater and saltwater systems as described below.

Tilapia and pinfish were selected as representative fish species that live in a freshwater and a saltwater environment, respectively. Tilapia were collected at a fresh water lake in Bellair, Fla., U.S.A. Pinfish were collected from a mangrove coastal seawater site located at the same location as the tilapia. Within 1 hour of catch, live fish were transported to the laboratory and raised in the dark without feeding, while constant oxygen is pumped using air stones. The tilapia (7.97±1.15 lb; N=15) were raised in two 75 L coolers (control group and freshwater chabazite group) with three tilapias in each cooler. Each cooler contained 50 L of freshwater.

The pinfish (0.07±0.02 lb; N=200) were maintained in two 38 L buckets (control group and saltwater chabazite group) with approximately 30 pinfish in each bucket with 27 L of seawater. The water temperature ranged from 22° C. to 23° C. The pH of freshwater and seawater were 7.19±0.19 and 7.48±0.02, respectively. The water was sampled every hour for 24 hours. According to the requirement of Institutional Animal Care and Use Committee (IACUC), fish that show end point signs (i.e., inactive, not eating, surface breathing) were euthanatized.

For the freshwater experiment, in the control group, the ammonia accumulation rate is 4.68±0.38 mg/kg fish/h ($R^2$=0.97). The k in the freshwater chabazite group is 3.42±0.36 mg/kg fish/h ($R^2$=0.94). In water, the total ammonia is present as free ammonia form ($NH_3$) and ammonium form ($NH_4^+$). Both are maintaining at equilibrium conditions in water according to the following equation:

$$NH_3 + H_2O \leftrightarrow NH_4^+ + OH^- \tag{15}$$

Figure 10:
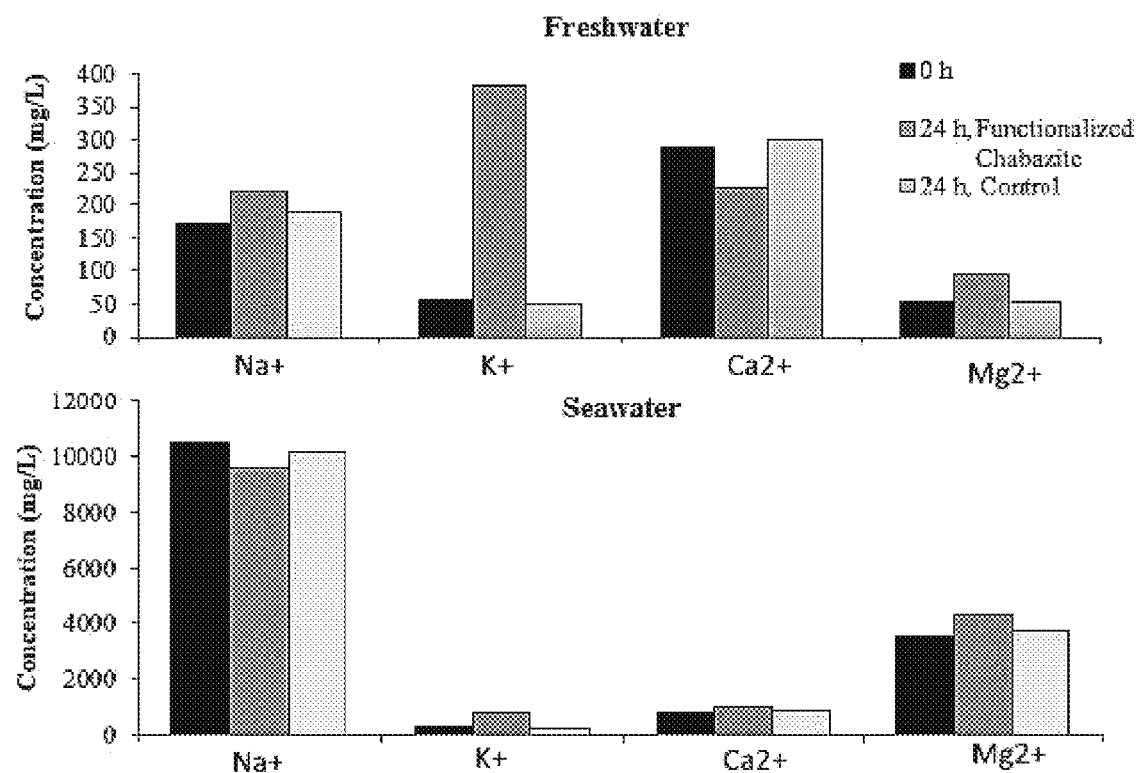
FIG. 10 is a series of graphs depicting ion comparison before and after functionalized chabazite intervention. Freshwater (Top) and Seawater (Bottom).

Ammonia removal by the ion exchange process occurs when $NH_4^+$ is exchanged by other changeable ions ($Na^+$, $Mg^{2+}$ and $Ca^{2+}$) in the zeolite, which shifts the equilibrium from left to right in Equation 15, which allows for a decrease in the concentration of $NH_3$. The top graph in FIG. 10 shows the exchangeable ion concentration in the water before and after the in-vivo experiment. The ion concentration is detected by Ion Chromatography (IC, Metrohn 850, Switzerland). The increase of $Na^+$ and $Mg^{2+}$ is attributed to the ion exchange process, when the $NH_4^+$ is taken up by the freshwater chabazite, the $Na^+$ and $Mg^{2+}$ are released. The order of ion selectivity of chabazite is $K^+>NH_4^+>Na^+>Ca^{2+}>Mg^{2+}$. The sharp increase of $K^+$ was caused by the addition of phosphate buffer. The decrease in $Ca^{2+}$ is due to the formation of calcium phosphate precipitates.

For the saltwater experiment, the ammonia accumulation for the control group is (k=6.68±0.24 mg/kg fish/h, $R^2$=0.99, p-value 7.90E-10) while in the saltwater chabazite group it is (k=6.38±0.37 mg/kg fish/h, $R^2$=0.98). The high $Na^+$ ion concentration reduces the effectiveness of the ion exchange process (Miladinovic et al., 2004).

The bottom graph in FIG. 10 shows the exchangeable ion concentrations in seawater before and after exposure to functionalized saltwater chabazite. The decreasing of $Na^+$ is most probably due to the ion exchange process since $Na^+$ is the dominant cation in the liquid phase (Colella, 1996). The increase of $K^+$ was created by the addition of phosphate buffer. By considering the ion selectivity of $K^+$ and $Na^+$, it is recommended that sodium phosphate buffer be used instead of potassium phosphate buffer in this process. The slightly increasing $Ca^{2+}$ and $Mg^{2+}$ might be explained due to the poor ion exchange process by saltwater chabazite in seawater.

Example 3—Toxicity Experiment

*Daphnia magna* neonates (age<24 h) were used in the toxicity test. The tests were conducted at 23° C. Ten neonates were placed in a 100 mL transparent plastic beaker with triplicates for each group. The number of dead neonates was recorded at 24 and 48 hours after the initiation of the test. The test water included spring water (control), freshwater chabazite or saltwater chabazite added water. The concentration of each was the daily maximum dose designed to be added to the water (Table 11). The $LC_{50}$ of each chemical was also tested. The $LC_{50}$ refers to the concentration of a substance that is lethal to 50% of the animals in the toxicity test (Boyd, 2005). The exposure periods were 24 and 48 hours. Five concentrations were tested from 0 to 2 g/L.

TABLE 11

Daily maximum dose of ammonia removal substance

| Substances | Daily maximum dose (g/L/day) |
| --- | --- |
| Freshwater Chabazite (FC) | 4.6 |
| Saltwater Chabazite (SC) | 8.8 |

Figure 11:
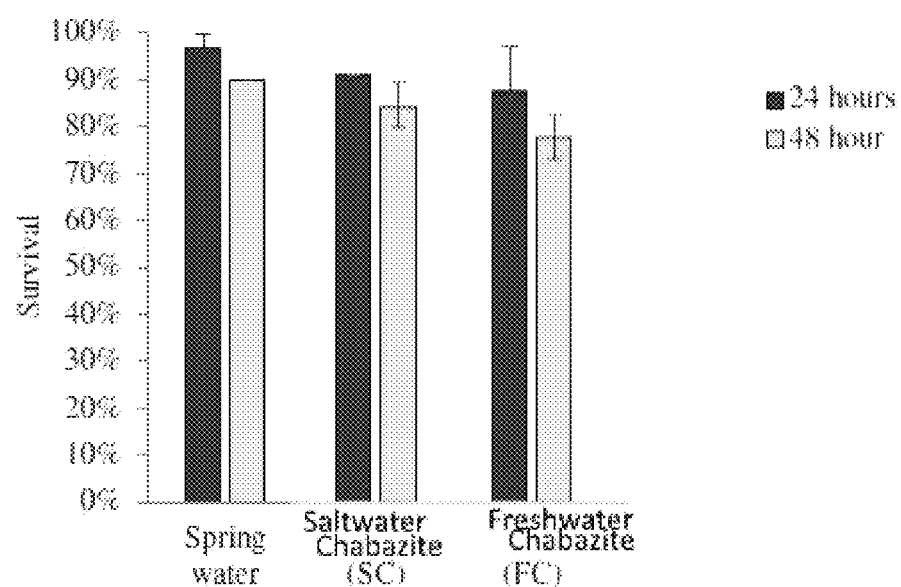
FIG. 11 is a graph depicting toxicity comparison between control (spring water, functionalized freshwater chabazite and functionalized seawater chabazite.

The *Daphnia Magna* is the regulated specie by USEPA Toxic Substance Control Act (FSCA) for toxicity tests (Hayes, 2007). According to the EPA guideline for the toxicity test, the survival percentage of *Daphnia Magna* in the control group should be equal or higher to 90% at the end of testing time (USEPA, 2002). This criterion is fulfilled in this experiment. Both the freshwater chabazite and the saltwater chabazite was found to be nontoxic to *Daphnia Magna* neonates as shown in FIG. 11.

Example 4—Regeneration Efficiency

Figure 12:
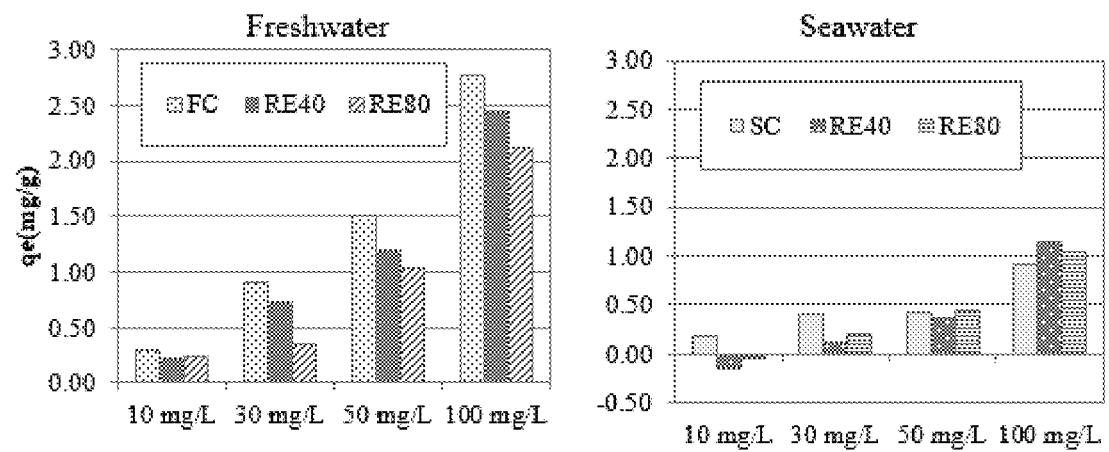
FIG. 12 is a series of graphs depicting ammonium adsorption capacity comparison between original and regenerated chabazite for both freshwater and seawater functionalized chabazite.

FIG. 12 shows the ammonium adsorption capacity comparison between original and regenerated chabazite. In the case of freshwater, the ammonium adsorption capacity ($q_e'$) was decreased after regeneration. The RE of $RE_{40}$ was 72%~88%, and the RE of $RE_{80}$ was 38%~80%. In terms of seawater, the ammonium adsorption started to have an interesting change. When $RE_{40}$ was used to remove 10 mg/L $NH_4^+$—N, ammonium desorption occurred. The most probable reason is the presence of competing ions in seawater. Since seawater has a very high concentration of $Na^+$, the ion exchange process went from right to the left (Eq. 16) and caused more release of $NH_4^+$—N.

$$\text{Chabazite-}Na^+ + X^+ \leftrightarrow \text{Chabazite-}X^+ + Na^+ \quad (16)$$

Costs

Table 6 presents the cost of materials for the chabazite system. The total cost compares favorably to commercial water conditioners which range from $4-10.

TABLE 6

Material Costs for Chabazite, Dye, and Buffer

| Component | Cost/Day |
| --- | --- |
| Chabazite | $1.48 |
| Dye | $0.77 |
| Buffer | $0.13 |
| Bag | $0.64 |
| Other | $0.50 |
| TOTAL | $3.53 |

CONCLUSION

Ammonium removal by chabazite in either freshwater or seawater was studied. There were no structural changes of chabazite after being modified by synthetic freshwater or sodium chloride. Experimental kinetic data suggests that ammonium removal follows a pseudo-second-order reaction model, indicating that ammonium sorption in chabazite follows two steps. The diffusion model shows that film diffusion is dominant in the ammonium sorption in freshwater, while pore diffusion dominated ammonium sorption in seawater. The isotherm studies showed that non-linear regression has the best fit for ammonia removal in both freshwater and seawater. The Sips isotherm indicates that the ammonium adsorption is not a simple process that can be described by only one simplified isotherm. The regenerated chabazite has lower ammonium removal capacity than original chabazite in freshwater, while in seawater, ammonium desorption was found when the initial ammonium concentration was low.

Definition of Claim Terms

Ammonium: a positively charged polyatomic ion with the chemical formula $NH_4^+$. It may be formed by the protonation of ammonia ($NH_3$).

Buffer: an aqueous solution consisting of a mixture of a weak acid and its conjugate base, or vice versa. Its pH changes very little when a small or moderate amount of strong acid or base is added to it and thus it may be used to prevent changes in the pH of a solution.

Chabazite: a tectosilicate mineral with the formula (Ca, $Na_2,K_2,Mg)Al_2Si_4O_{12}.6H_2O$.

Functionalize: to change surface properties of a material by adding or removing functional groups. In an embodiment, the term "functionalize" is used to refer to ion exchange in a material, for example a tectosilicate material such as chabazite, in which $NH_4^+$ is exchanged by other changeable ions ($Na^+$, $Mg^{2+}$, and $Ca^{2+}$) in the tectosilicate. "Freshwater chabazite" and "Saltwater chabazite" as used herein refer to chabazite that has been functionalized according to the procedures described herein for the listed type.

Ion selectivity: the affinity a compound shows for reacting with different ions. An ion with a higher ion selectivity will tend to displace an ion in the compound that has a lower ion selectivity.

Tectosilicate compound: a silicates compound having a three-dimensional framework of silicate tetrahedra with $SiO_2$ or a 1:2 ratio.

Zeolite compound: a type of tectosilicate compound that is a porous hydrated aluminosilicate mineral formed from interlinked tetrahedra of alumina ($AlO_4$) and silica ($SiO_4$). Examples of zeolites include, but are not limited to, chabazite, clinoptilolite, and mordenite.

About: being within an acceptable error range for the particular value as determined by one of ordinary skill in the art, which will depend in part on how the value is measured or determined, i.e. the limitations of the measurement system, i.e. the degree of precision required for a particular purpose. As used herein, "about" refers to ±10% of the numerical.

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually. It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method for producing an ammonia removal agent for saltwater environments, comprising:
    obtaining a tectosilicate compound wherein the tectosilicate compound is chabazite;
    functionalizing the tectosilicate compound, comprising soaking the tectosilicate compound in a synthetic saltwater solution for 24 hours and replacing cations in the tectosilicate compound with sodium ions wherein the synthetic saltwater solution consists of:
    an amount of water;
    10.780 g/L of sodium;
    0.42 g/L of potassium;
    1.32 g/L of magnesium;
    19.290 g/L of chloride
    0.400 g/L of calcium;
    0.200 g/L of bicarbonate;
    2.66 g/L of sulfate; and
    0.241 g/L of alkalinity;
    washing the functionalized tectosilicate compound in deionized water; and
    drying the functionalized tectosilicate compound.

2. The method of claim 1, further comprising washing the tectosilicate compound in deionized water and drying the tectosilicate compound prior to soaking the tectosilicate compound in the synthetic saltwater solution.

3. The method of claim 2, wherein the tectosilicate compound is washed using a shaker table for 24 hours to remove small particles.

4. The method of claim 1, wherein functionalizing the tectosilicate compound increases a percentage of sodium in the tectosilicate compound by at least 30 percent.

5. The method of claim 1, wherein the functionalized tectosilicate compound is dried in an oven at 110° C. for 5 hours.

6. The method of claim 1, wherein the functionalized tectosilicate compound is regenerated by removing adsorbed ammonium ions and replacing them with sodium ions.

7. A method for controlling an ammonia level in a water environment, comprising:
    providing a water environment;
    providing a functionalized tectosilicate compound, the functionalized tectosilicate compound produced by the steps of:
    obtaining a tectosilicate compound wherein the tectosilicate compound is chabazite;
    functionalizing the tectosilicate compound, comprising:
        soaking the tectosilicate compound in a synthetic freshwater solution or a synthetic saltwater solution; and
        removing ions from the tectosilicate compound that have a lower cationic affinity than ammonium ions when the synthetic freshwater solution is used or replacing cations in the tectosilicate compound with sodium ions when the synthetic saltwater solution is used;
    wherein the synthetic freshwater solution consists of:
    an amount of water;
    0.075 g/L of sodium;
    0.00312 g/L of potassium;
    0.024 g/L of magnesium;
    0.193 g/L of chloride
    0.043 g/L of calcium;
    0.0048 g/L of bicarbonate;
    0.096 g/L of sulfate; and
    0.310 g/L of alkalinity;
    wherein the synthetic saltwater solution consists of:
    an amount of water;
    10.780 g/L of sodium;
    0.42 g/L of potassium;
    1.32 g/L of magnesium;
    19.290 g/L of chloride
    0.400 g/L of calcium;
    0.200 g/L of bicarbonate;
    2.66 g/L of sulfate; and
    0.241 g/L of alkalinity;
    washing the functionalized tectosilicate compound in deionized water and then drying the compound; and
    providing a container for the functionalized tectosilicate compound and a solid pH buffer, the container comprising a porous material to allow liquid to flow through the material;
    providing for the container of functionalized tectosilicate compound to be placed in a water environment comprising a source of ammonia;
    buffering the water system to a pH of about 7 and shifting an equilibrium between ammonia and ammonium in the water environment towards ammonium; and
    adsorbing the ammonium using the functionalized tectosilicate.

8. The method of claim 7, further comprising regenerating the functionalized tectosilicate compound by removing the adsorbed ammonium and replacing with sodium ions.

9. The method of claim 7, further comprising washing the tectosilicate compound in deionized water and drying the tectosilicate compound prior to soaking the tectosilicate compound in the synthetic freshwater solution or the synthetic saltwater solution.

10. The method of claim 7, wherein removing ions from the tectosilicate compound soaked in the synthetic freshwater solution comprises removing sodium ions from the tectosilicate compound.

11. The method of claim 10, wherein functionalizing the tectosilicate compound reduces a percentage of sodium ionically bound to the compound by at least 50 percent.

12. The method of claim 7, wherein the functionalized tectosilicate compound is dried in an oven at 110° C. for 5 hours.

13. The method of claim 7, wherein functionalizing the tectosilicate compound by soaking the tectosilicate compound in the synthetic saltwater solution increases a percentage of sodium in the tectosilicate compound by at least 30 percent.

14. A system for removing ammonia from a saltwater environment, comprising:
   a saltwater environment containing ammonia;
   a functionalized tectosilicate compound, the functionalized tectosilicate compound produced by the steps of:
      obtaining a tectosilicate compound wherein the tectosilicate compound is chabazite;
      functionalizing the tectosilicate compound, comprising soaking the tectosilicate compound in a synthetic saltwater solution and replacing cations in the tectosilicate compound with sodium ions wherein the synthetic saltwater solution consists of:
      an amount of water;
      10.780 g/L of sodium;
      0.42 g/L of potassium;
      1.32 g/L of magnesium;
      19.290 g/L of chloride
      0.400 g/L of calcium;
      0.200 g/L of bicarbonate;
      2.66 g/L of sulfate; and
      0.241 g/L of alkalinity;
      washing the functionalized tectosilicate compound in deionized water and then drying the compound; and
   a pH buffer, wherein the pH buffer is a phosphate buffer in a solid state wherein an amount of the pH buffer used is such that the pH buffer maintains a pH of 7 in the saltwater environment; and
   a container holding the functionalized tectosilicate compound and the pH buffer, the container comprising a porous material to allow water to flow through the material;
   wherein the pH of 7 of the water environment shifts an equilibrium between ammonia and ammonium in the water environment towards ammonium, and the ammonium is adsorbed by the functionalized tectosilicate.

15. The system of claim 14, wherein the functionalized tectosilicate compound is regenerated after use by removing the adsorbed ammonium and replacing with sodium ions.

16. The system of claim 14, wherein functionalizing the tectosilicate compound increases a percentage of sodium in the compound by at least 30 percent.

17. The system of claim 14, wherein the phosphate buffer is $Na_2HPO_4$, $NaH_2PO_4$, or a combination thereof.

* * * * *